(12) United States Patent
Almeida et al.

(10) Patent No.: US 8,219,258 B1
(45) Date of Patent: Jul. 10, 2012

(54) QUEUING ACCESS TO A SHARED POWER SUPPLY

(75) Inventors: Edison Almeida, Brighton, MA (US); Jonathan O. Stahl, Needham, MA (US)

(73) Assignee: eCurv, Inc., Cambridge, MA (US)

( * ) Notice: Subject to any disclaimer, the term of this patent is extended or adjusted under 35 U.S.C. 154(b) by 0 days.

(21) Appl. No.: 13/402,283

(22) Filed: Feb. 22, 2012

Related U.S. Application Data

(60) Provisional application No. 61/463,946, filed on Feb. 25, 2011.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 1/00 | (2006.01) |
| H02J 3/14 | (2006.01) |
| G05F 1/10 | (2006.01) |
| G05F 5/00 | (2006.01) |
| H02H 3/00 | (2006.01) |

(52) U.S. Cl. ........ 700/291; 700/286; 700/295; 700/297; 307/34; 307/39; 307/43; 323/234; 323/236; 323/299; 361/81; 361/139; 361/189

(58) Field of Classification Search .................. 700/286, 700/291, 295, 297; 307/34–35, 38–39, 43; 323/234, 236, 299; 361/81, 139, 189
See application file for complete search history.

(56) References Cited

U.S. PATENT DOCUMENTS

| | | | |
|---|---|---|---|
| 4,023,043 A * | 5/1977 | Stevenson | 307/38 |
| 4,090,062 A | 5/1978 | Phillips et al. | |
| 4,136,393 A | 1/1979 | Fox | |
| 4,208,593 A | 6/1980 | Sullivan | |
| 4,211,933 A | 7/1980 | Hedges et al. | |
| 4,421,992 A | 12/1983 | Hibbard et al. | |
| 4,998,024 A | 3/1991 | Kirk et al. | |
| 5,414,640 A | 5/1995 | Seem | |
| 5,687,139 A * | 11/1997 | Budney | 368/10 |
| 5,905,616 A | 5/1999 | Lyke | |
| 6,119,469 A | 9/2000 | Elwood | |
| 6,590,304 B1 | 7/2003 | Manning et al. | |
| 6,774,506 B2 * | 8/2004 | Hashimoto et al. | 307/38 |
| 6,925,066 B1 * | 8/2005 | Chekuri et al. | 370/319 |
| 7,110,832 B2 | 9/2006 | Ghent | |
| 7,142,523 B1 * | 11/2006 | Chekuri et al. | 370/328 |
| 7,206,670 B2 * | 4/2007 | Pimputkar et al. | 700/291 |
| 7,825,542 B2 * | 11/2010 | Kohler et al. | 307/64 |
| 7,827,813 B2 * | 11/2010 | Seem | 62/186 |
| 7,830,037 B2 * | 11/2010 | Hirst | 307/39 |

(Continued)

*Primary Examiner* — Ramesh Patel

(74) *Attorney, Agent, or Firm* — David H. Judson

(57) ABSTRACT

A method of queuing access to a power supply shared by a set of electrical access points. The access points turn on independently from one another and thus have independent power draws. Each access point has a specific power draw when on. The on state and associated power draw of each of access point is identified, and a load duration curve for each access point is normalized (i.e., combined with load duration curve (s)) from the other access points) into a probability distribution function. The probability distribution function is a normalized load duration curve that thus accounts for a varying set of "operating states" that may occur with respect to the set of access points (when viewed collectively). Each operating state has an associated probability of occurrence. As the operating state of the set (of access points) changes, access to the power supply is selectively queued, or de-queued (if previously queued).

28 Claims, 6 Drawing Sheets

U.S. PATENT DOCUMENTS

| | | | |
|---|---|---|---|
| 7,860,702 B1 * | 12/2010 | Evans et al. | 703/18 |
| 7,869,904 B2 * | 1/2011 | Cannon et al. | 700/295 |
| 7,894,946 B2 * | 2/2011 | Kulyk et al. | 700/295 |
| 7,925,388 B2 * | 4/2011 | Ying | 700/295 |
| 7,962,248 B2 | 6/2011 | Flohr | |
| 2004/0070275 A1 | 4/2004 | Niv | |
| 2004/0075343 A1 | 4/2004 | Wareham et al. | |
| 2004/0153170 A1 | 8/2004 | Santacatterina et al. | |
| 2005/0038571 A1 | 2/2005 | Brickfield et al. | |
| 2009/0322151 A1 | 12/2009 | Ferlitsch | |
| 2010/0289333 A1 | 11/2010 | Gilpatrick | |
| 2011/0035073 A1 | 2/2011 | Ozog | |

* cited by examiner

QUEUING ACCESS TO A SHARED POWER SUPPLY

This application is based on and claims priority from Ser. No. 61/463,946, filed Feb. 25, 2011.

COPYRIGHT STATEMENT

This application includes subject matter that is protected by copyright. All rights are reserved.

BACKGROUND OF THE INVENTION

1. Technical Field

The subject matter of this disclosure relates generally to regulating electric power.

2. Background of the Related Art

The modern electric utility industry began in the 1880s. It evolved from gas and electric carbon-arc commercial and street lighting systems. The first electricity generating station introduced the industry by featuring the four key elements of a modern electric utility system: reliable central generation, efficient distribution, a successful end-use (the light bulb), and a competitive price. When the main and only end-use of electric power was nighttime light bulbs, reliable central generation meant that electric power supply service was available all of the time for all of the electric power demand. In the late 1880s, power demand for electric motors brought the industry from mainly nighttime lighting to 24-hour service and dramatically raised electricity demand for transportation and industry needs. In addition, the original direct current (DC) electric system was quickly replaced by low frequency (50-60 Hz) alternating current (AC) systems.

Due to the critical importance of electric power in the economic development of society, the core electric system engineering planning requirement for a reliable electric power supply was broadly defined under the assumption of power supply availability all of the time for all electric demand end-uses. Electric power systems have historically been dimensioned to handle its annual coincident peak demand. Tariffs are based on the situation when there is peak demand. All these assumptions led to the engineering of an electric power infrastructure where supply growth (generation capacity power in Watts) constantly outpaces demand growth (average demand power in Watts). Electric power generation capacity has grown faster than average demand capacity since the industry inception, while the ratio of average demand power by generation capacity power (capacity factor) has steadily been between 40-50%. Today, appliances have unrestricted access to electric power. Many sensor-automated appliances respond to environmental factors without human interaction. For instance, weather variation causes power draw synchronization on temperature-sensing appliances such as refrigerators and air conditioners. When multiple appliances draw power synchronously, a resonant coincident peak demand phenomenon occurs.

Electric utilities are accountable for delivering power to their end-user customers 100% of the time. Those same customers pay for immediate access to power to serve their needs, applying that power to drive a broad range of electric appliances that meet specific end user requirements. Peak demand occurs when the need for power, i.e. customer utilization of power to operate their electric appliances, exceeds the base load generating capacity of a local ISO/RSO network. This coincident peak event triggers the acquisition of additional/higher cost generating capacity by the utility provider to meet their reliability obligation, the costs of which often are passed directly on to their customers.

Electric utility customers may have either a single building/property with many operating appliances and/or a number of buildings/properties spread across one or more metropolitan geographies (an operating environment). Within either a given building/property or Metropolitan Service Area (MSA), a set of common internal and external environmental factors will be evident, as in a range of + or −2 degrees Fahrenheit outside air temperature within the MSA or a similar narrow range of temperatures room-to-room within a customer's building/property. In any given operating environment, electric appliances with a similar function, e.g., sensor-automated environmental cooling, will exhibit a high degree of synchronous "on/off" operational behaviors. Thus, for example, it has been found that these appliances (such as air conditioners and refrigerators) demanded power simultaneously a high percentage of the time to maintain end-user operational objectives such as a target room temperature. When the majority of appliances are "on" simultaneously, a coincident peak is generated, requiring additional electric power supply resources to meet the appliances' electric power demand. A coincident peak demand event, which typically occurs less than 5% of the time during a given billing cycle, nevertheless can account for over 20% of the total cost of power charged by an electric utility to its end user customers.

There is a need in the art to provide a system that regulates an electric appliance's access to its power supply to systematically control coincident peak demand. This disclosure addresses this need.

BRIEF SUMMARY

A method of queuing access to a power supply shared by a set of electrical access points is described. The access points can turn on and off independently from one another and thus have independent power draws. The access points typically are also located remote from one another. One or more electrical appliances or devices may be associated to a particular access point. Each access point has a specific power draw when it is on (i.e. drawing power from the power supply). According to this disclosure, the on state and associated power draw of each of access point is identified, and a load duration curve for each access point is normalized (i.e., combined with load duration curve(s)) from the other access points) into a probability distribution function. The probability distribution function is a normalized load duration curve that thus accounts for a varying set of "operating states" that may occur with respect to the set of access points (when viewed collectively). Thus, if there are "n" access points, there are $2^n$ possible operating states for the access point set, with each operating state being represented by a set of simultaneous "events" corresponding to some subset of the access points (which subset may include all of the access points) being "on" or "off," as the case may be. Each operating state has an associated probability of occurrence. According to the method, as the operating state of the set (of access points) changes (as represented by the on/off events), access to the power supply is selectively queued, or de-queued (if previously queued).

The probability of occurrence of a particular operating state may be associated with a grade of service (GoS), where GoS is a probability of electric power access being queued for more than a specified time interval. In a preferred embodiment, the probability distribution function is a transformed (or "non-normalized") Erlang C probability distribution that models a load duration curve (representing the combined set of access points) that associates total power demand for a given GoS.

In a representative, but non-limiting embodiment, the above-described method is implemented in a centralized computing device (sometimes referred to as a "power router"), and each access point is implemented in a switch, such as a digital electronic switch. According to the described approach, and assuming queuing is not then in effect (an "available" mode), when an operating state probability (representing a particular GoS) is met or exceeded, the system enters a queuing (or "busy") mode to thereby control the "time" at which one or more access points may then access the shared power supply. Preferably, the particular turn-on "time" for an access point is controlled using an "access priority code" that the power router provides to the digital electronic switch located at an access point. The power router continually generates the access priority codes and provides these codes to the switches according to the queuing scheme. At a particular point-in-time, a set of access priority codes (APCs) thus defines a relative queuing order of the access points that minimizes individual access point queuing time and power draw collisions from the power supply.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
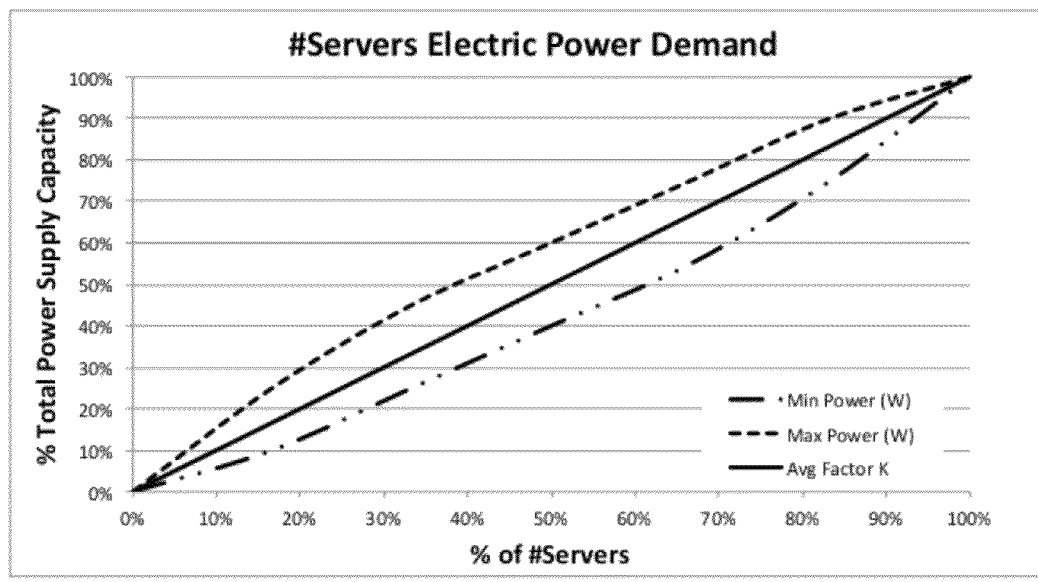
FIG. 1 is a power supply capacity plot.

As described above, this disclosure concerns a method of queuing access to a power supply shared by a set of electrical access points. The access points can turn on and off independently from one another and thus have independent power draws. The access points typically are also located remote from one another. One or more electrical appliances or devices may be associated to a particular access point. Each access point has a specific power draw when it is on (i.e. drawing power from the power supply).

In general, queuing access (to the power supply) is controlled in the following manner. The on state and associated power draw of each of access point is identified, and a load duration curve for each access point is normalized (i.e., combined with load duration curve(s)) from the other access points) into a probability distribution function. The probability distribution function is a normalized load duration curve that thus accounts for a varying set of "operating states" that may occur with respect to the set of access points (when viewed collectively). Preferably, the probability distribution function is a transformed (or non-normalized) Erlang C probability distribution function.

The queuing access method of this disclosure may be implemented in a computing device associated with one or more electrical power access points that share a power supply. In one embodiment, the probability distribution function is implemented within an electric appliance power router (EAPR), which is a computer system that regulates access to a shared power supply to systematically control coincident peak demand. In particular, through associated digital electronic switches (DES) located at the access points, the EAPR interprets access point "on" or "off" power draw states as binary data, and queues access to the power supply with access priority codes (APC) that it supplies to the various switches. A particular APC controls turn-on of the access point (in particular, one or more electrical appliances or devices associated therewith). In addition, coincident peak demand is limited to a target "peak-power" threshold while still delivering electric service within a grade of service (GoS) that follows a probability distribution function (e.g., a transformed Erlang distribution) applied to electric power. Preferably, Grade of Service (GoS) is defined with reference to the electric system peak-power period when its power consumption intensity is the greatest. GoS is the probability of electric power access in a power line group being queued for more than a specified time interval, expressed as a decimal fraction. By queuing access to a shared power supply in this manner, electrical appliances (associated with the access points) access their power supply in an orderly fashion that minimizes the power draw collisions that lead to coincident peak demand.

The Erlang Distribution as Applied to Electric Power

The following section provides additional details regarding the probability distribution function and the use of Erlang C as applied to electric power. Familiarity with Erlang distributions (and Erlang data tables) is presumed.

The Erlang distribution is a continuous probability distribution developed by A. K. Erlang to examine the number of telephone calls that might be made at the same time to switching stations operators. This work on telephone traffic engineering was later expanded to consider waiting times in queuing systems in general. The Erlang (E) is a dimensionless unit used in telephony as a statistical measure of carried load on service-providing telephone circuits. Offered traffic (in Erlangs) is related to the call arrival rate, $\lambda$, and the average call holding time, h, by the following relationship: $E=\lambda h$, provided that h and $\lambda$ are expressed using the same units of time (seconds and calls per second, or minutes and calls per minute).

The Erlang B model is a formula for the blocking probability derived from the Erlang distribution to describe the probability of lost calls in a group of circuits. The formula applies under the condition that an unsuccessful call is not queued. The following formula provides the probability $P_b$ that a new call arriving at the circuit group is rejected because all servers (circuits) are busy; in particular, B(E, m) when E Erlang of traffic are offered to m trunks (communication channels):

$$P_b = B(E, m) = \frac{\frac{E^m}{m!}}{\sum_{i=0}^{m} \frac{E^i}{i!}}$$

In the above formula, $P_b$ is the probability of blocking, m is the number of resources such as servers or circuits in a group, and E=λh is the total amount of traffic offered in Erlangs.

The Erlang C model expresses the waiting probability in a queuing system. If all circuits are busy, the request is queued. An unlimited number of requests may be held in the queue simultaneously. The following formula calculates the probability of queuing carried traffic, assuming that queued calls stay in the system until they can be handled:

$$P_W = \frac{\frac{A^N}{N!}\frac{N}{N-A}}{\sum_{i=0}^{N-1}\frac{A^i}{i!} + \frac{A^N}{N!}\frac{N}{N-A}}$$

In the above formula, A is the total traffic offered in units of Erlangs, N is the number of servers, and $P_W$ is the probability that a customer has to wait for service.

According to this disclosure, an Erlang distribution is transformed to apply to electric power system planning under a set of assumptions. These assumptions are the following: (i) electric appliances are either "on" or "off" and utilize a group of circuits (electric power wires) to get access to the shared power supply; (ii) electric appliances use electric power of its group of circuits when they are "on"; (iii) without access control (as provided by the disclosed queuing access method), an electric appliance is serviced by its power supply following an Erlang B distribution and access is not queued (and the power supply meets all electric demand all of the time); (iv) a queuing access control system for electric appliances (according to this disclosure) preferably follows an Erlang C distribution, and queued appliances stay in the system until they can be handled; (v) power supply capacity is equivalent to the "number of servers" in the traditional Erlang distribution; (vi) average power demand over a period of time is equivalent to "carried load" in the Erlang distribution; and (vii) power supply capacity equals the power demanded at a given time. Under these assumptions, the technique transforms the Erlang distribution to electric power demand according to the following rules. First, the "number of servers" is equivalent to the power supply capacity ($P_s$) in Megawatts (MW) times a constant factor "K," namely: N~$P_s$(MW)*K. This relationship is represented in the plot in FIG. 1. Second, the "carried traffic" is equivalent to average demand power ($P_D$) in Megawatts (MW) times the same constant factor, namely: E~$P_D$ (MW)*K.

Figure 2:
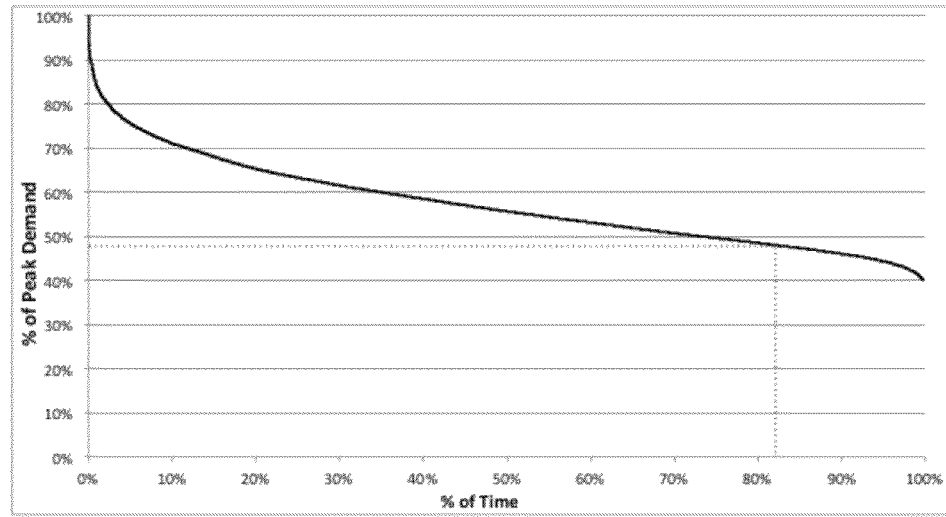
FIG. 2 illustrates a load duration curve (LDC) for an electric system.
Figure 3:
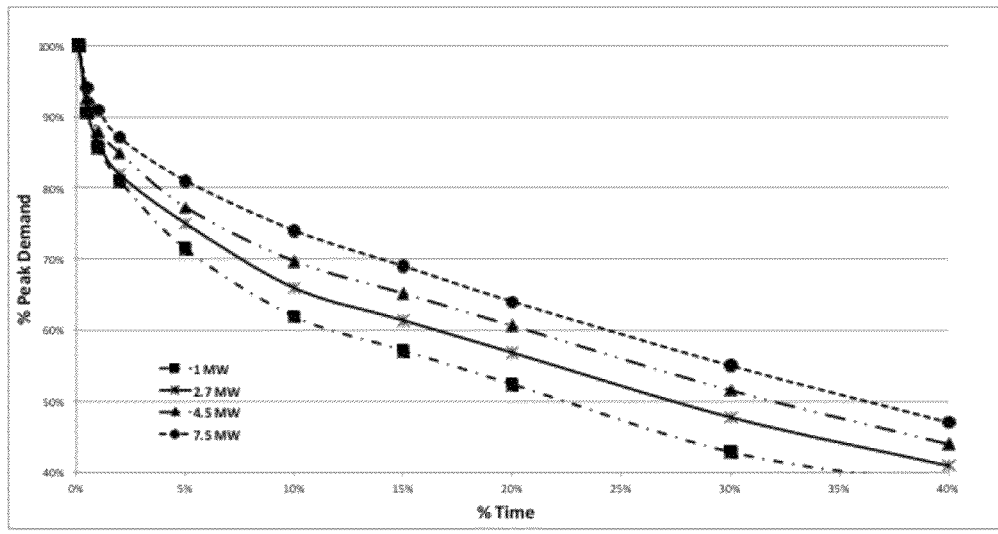
FIG. 3 illustrates an electric system LDC modeled by a transformed Erlang B distribution.
Figure 4:
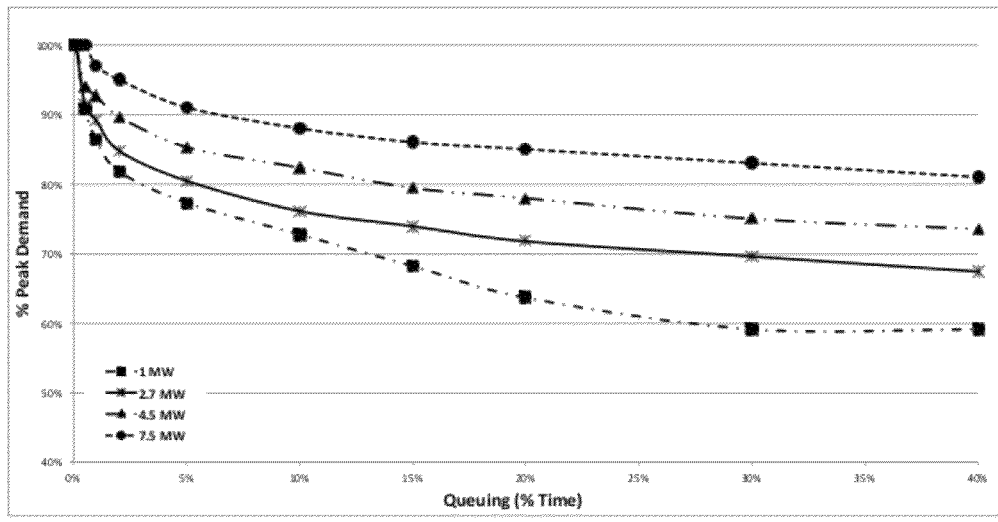
FIG. 4 illustrates an electric system LDC modeled by a transformed Erlang C distribution.
Figure 5:
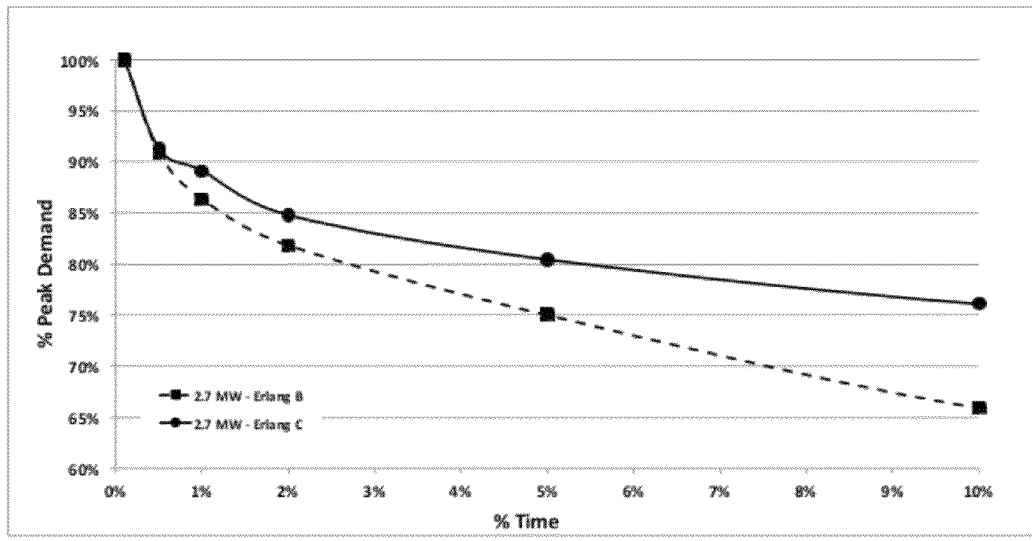
FIG. 5 illustrates a comparison of the electric system LDC models in FIG. 3 and FIG. 4.

By way of further background, a "load duration curve" (LDC) is used in electric power generation to illustrate the relationship between generating capacity requirements and capacity utilization. A LDC is similar to a load curve but the demand data is ordered in descending order of magnitude, rather than chronologically. The LDC curve shows the capacity utilization requirements for each increment of load. The height of each slice is a measure of capacity, and the width of each slice is a measure of the utilization rate or capacity factor. The product of the two is a measure of electrical energy (e.g. kilowatt hours). FIG. 2 illustrates a representative load duration curve for an electric system. A transformed Erlang B distribution applied to electric power models the load duration curve for a given average demand power in Megawatts (MW), where "% time" represents the electric system Grade of Service (GoS). FIG. 3 illustrates a representative load duration curve modeled by transformed Erlang B. According to this disclosure, a transformed Erlang C distribution applied to electric power models the load duration curve for a given average demand power in Megawatts (MW), where "% time" represents the system "queuing (% time)." FIG. 4 illustrates a representative load duration curve modeled by transformed Erlang C. When implementing a power supply queuing access system according to this disclosure, the electric system load duration curve profile changes, increasing its capacity factor while decreasing its coincident peak demand. FIG. 5 illustrates the electric system load duration curve(s) modeled by transformed Erlang B and C, illustrating the comparison. For instance, in an electric system with 2.7 MW average power demand, for a peak demand target threshold at "80% Peak demand" and respective queuing time at "5% GoS", coincident peak demand is reduced by 20%.

Figure 6:
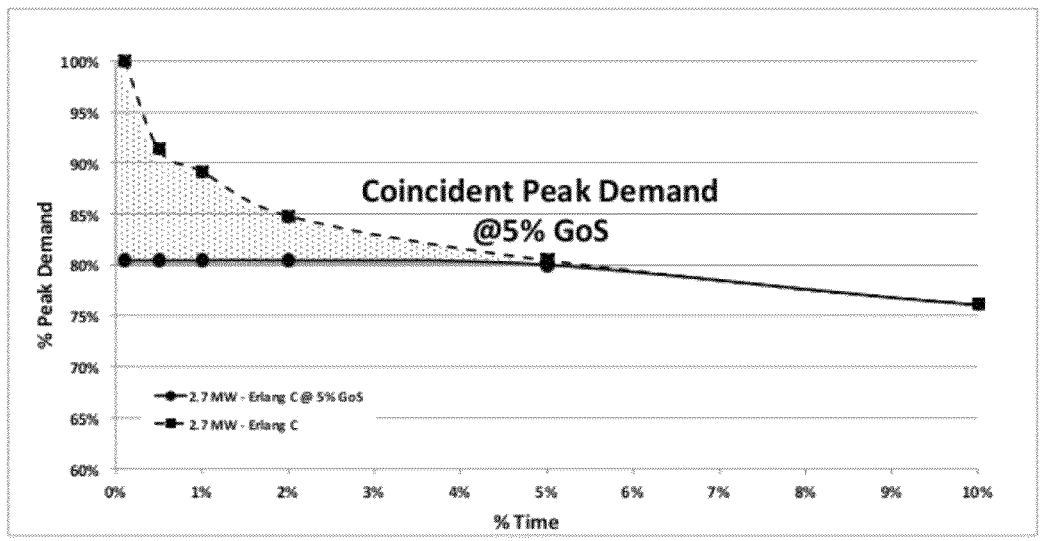
FIG. 6 illustrates how an EAPR executing the queuing access method of this disclosure controls coincident peak demand with respect to a power supply shared among a set of access points.

According to this disclosure, and as described above, the EAPR regulates access to a shared power supply to systematically control coincident peak demand. Preferably coincident peak demand is limited to a target "peak-power" threshold while still delivering electric service within a GoS that follows the transformed Erlang C distribution applied to electric power. FIG. 6 illustrates a representation of EAPR coincident peak demand mitigation according to this disclosure.

Implementation

Figure 7:
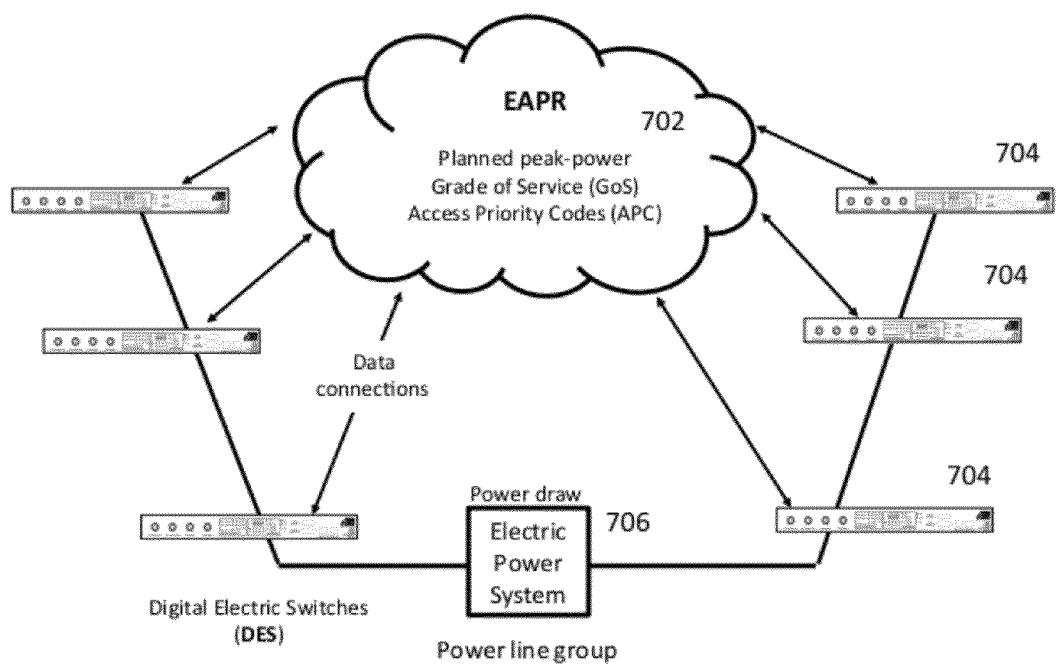
FIG. 7 illustrates a system that incorporates the queuing access control method of this disclosure.

An embodiment of the inventive subject matter is illustrated in FIG. 7. A "system" 700 that operates according to the principles described herein comprises an electric appliance power router 702, together with a set of digital electronic switches (each, a DES) 704. The nomenclature, such as EAPR or DES, should not be taken as limiting. In general, the EAPR is implemented in automated computing machinery, such as a computer system. The EAPR may be conceptualized as a "layer" on top of an existing power line group, and it is the power supply access layer. The DES may be any SCADA-compliant device or, more generally, a network-attached control device. As illustrated, each DES has a data connection 705 to the EAPR 702, the data connection may be over any type of network including, without limitation, fixed line, wireless or some combination thereof.

In the scenario where wireless communications are used, each of the DES and EAPR may include or have associated therewith a transceiver module. The transceiver module may be configured to communicate using various types of protocols, communication ranges, operating power requirements, RF sub-bands, information types (e.g., voice or data), use scenarios, applications, and the like. Thus, in various embodiments, the transceiver module may comprise one or more transceivers configured to support voice communication for a cellular radiotelephone system such as a GSM, UMTS, CDMA, and/or LTE system. The transceiver module also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, Long-Term Evolution protocols, etc.), WLAN protocols (e.g., IEEE 802.11a/b/g/n, IEEE 802.16, IEEE 802.20, and the like), PAN protocols, infrared protocols, Bluetooth protocols, EMI protocols including passive or active RFID protocols, and the like.

Other protocols and communications methods, e.g., using Internet Protocol (IP)-based networking technologies, SCADA (Supervisory Control and Data Acquisition)-compliant protocols, and the like, may also be used depending on the implementation.

Figure 8:
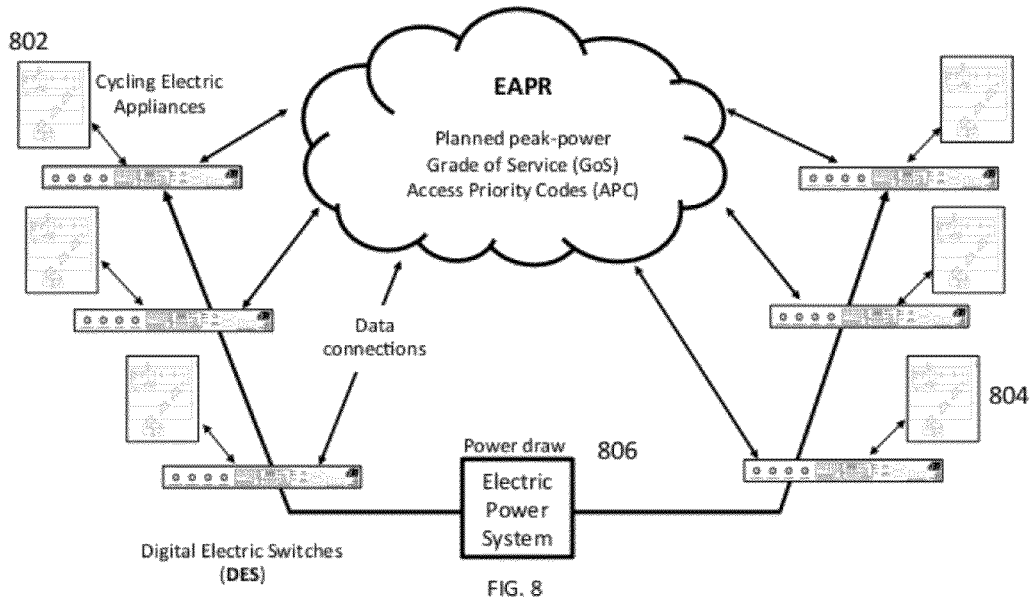
FIG. 8 illustrates another embodiment of the system shown in FIG. 7.

The switches 704 comprise electrical power "access points" with respect to an electric power system 706. The power system (or "supply") 706 is shared among the access points. Each access point is distinct in that it has an independent power draw from the power supply. Thus, each access point sharing the power supply can turn on/off independently from one another. Typically, the digital electronic switches are positioned in multiple geographically-dispersed locations, which locations may be remote from one another, although a pair of switches (each being a distinct access point) may be co-located physically in certain operating environments. As illustrated in FIG. 8, an access point represented by the DES may have associated therewith one or more electrical appliances or devices 802 and 804. These appliances or devices share the power supply 806. There may be one appliance or device per access point, or more than one appliance or device.

In general, the EAPR 700 regulates the digital electronic switches (DES) with a queuing order that maximizes the capacity factor of the power supply 706 (or 806, FIG. 8) and minimizes its coincident peak demand while delivering reliable and acceptable electric power service to any individual appliance's end-user within a grade of service (GoS). To this end, the EAPR preferably interprets an access point "on" or "off" power draw states as binary data. The EAPR queues access to the shared power supply (the power system) with so-called "access priority codes" (each, an "APC") through the digital electronic switches. In particular, the EAPR generates a set of APCs for the access points and provides each DES with a particular APC. The APC is the relative queuing order assigned to a specific DES. The APC set is generated periodically by the EAPR, and on a continuous basis. For simplicity of explanation only, an access point is assumed to have one electrical appliance associated therewith. An APC is defined using an electric appliance's power draw statistical measure on its electric power line, its end-use service requirements, and, as will be described, an "access priority request" (each, an APR). An APR is a signal given by an end-user that access to the power supply is needed immediately. This signal may be used to customize an end-user maximum acceptable queuing time in certain operating environments.

The electric appliance power router (EAPR) performs several functions. It monitors an electric network servers' power draw and limits power demand to a target "planned peak-power" threshold for a desired grade of service (GoS). To this end, the EAPR communicates access priority codes (APC) to each DES, ensures DES maximum queuing time integrity, and commutes to minimize individual DES queuing time. The EAPR also performs several administrative and management functions, such as authenticating the DES devices, collecting and storing DES data, updating DES firmware or software as needed, and providing a user interface through which permitted users can set or program system thresholds, alarms and automation routines, or obtain reports. Each digital electronic switch (DES) performs several functions. Its main operation is to request access to the power supply, to receive the APC, and to switch electrical power "on" at its EAPR-designated time on the queue (as determined by the APC). The DES also provides administrative functions such as authenticating and establishing secure digital communications with the EAPR, capturing end-user APRs, monitoring an associated appliance's power draw, and executing EAPR-supplied automation routines and micro-controller firmware or processor-based software updates.

As noted above, the access priority code (APC) is the relative queuing order assigned to a specific DES. The APC provided by the EAPR to a particular DES defines an electric appliance maximum queuing time at a given moment (or time period). The APC received at a DES is used to minimize total system queuing time when the electric system power draw (e.g., total power draw) is above a target (e.g., "planned peak-power") threshold and the EAPR starts its access queuing process. The APC takes into account the respective electric appliance end-use service requirements, which typically include one or more of the following: power draw (in watts, which is the average power draw when the electric appliance is "on" during its working cycle); usage time (in minutes, which is the average number of minutes the electric appliance is "on" during its working cycle); usage frequency (in minutes, which is the average number of minutes between the "on" times for the electric appliance); location (to identify the approximate geographical location of the appliance, and to ensure the appliance belongs to a respective EAPR electric circuit); end-user maximum acceptable queuing time (in seconds, which is the average time an appliance end-user would accept a delay in the appliance use, and this value may be an industry average, an end-user APR history, or some combination thereof); and an "access priority request" (APR) (as noted above, a signal given by the end-user that access to the power supply is needed immediately). The above set of one or more parameters are sometimes referred to as "APC parameters."

Figures 9, 10:
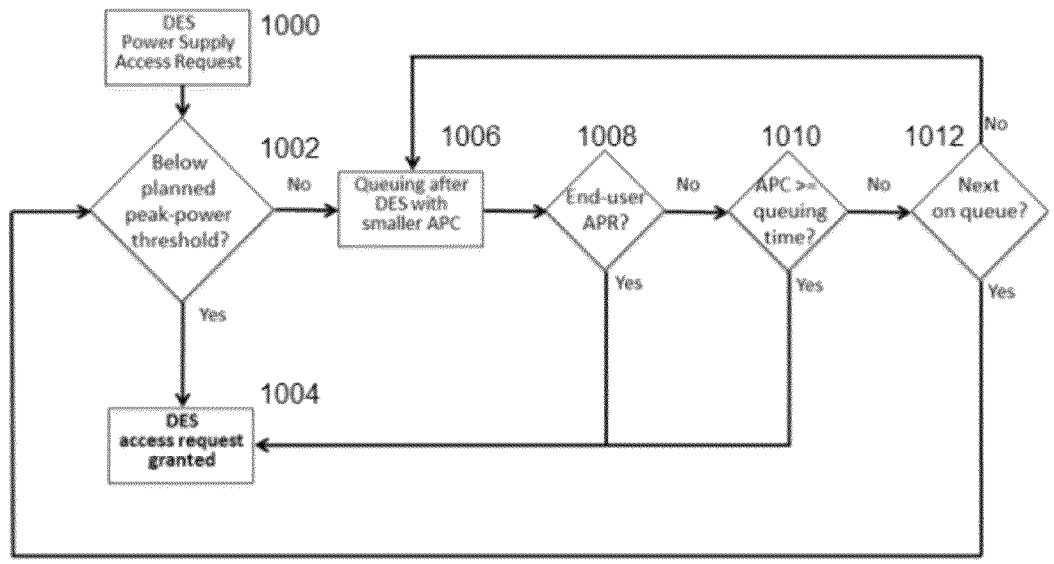
FIG. 9 illustrates an interaction between a digital electronic switch (DES) of this disclosure and the EAPR.
FIG. 10 is a flowchart illustrating the queuing prioritization technique of this disclosure.

FIG. 9 illustrates the basic interaction between a particular DES and the EAPR. This same interaction is carried out for each DES. At step 900, the DES initiates an access request to the EAPR, passing authentication parameters and the APC parameters (which may include an APR). At step 902, the EAPR completes the DES authentication and executes its queuing routine. The queuing routine is shown in FIG. 10, and it is described below. If the EAPR determines queuing is necessary (i.e., the system is in a "busy" mode), the EAPR sends the APC to the DES. (An APC is also sent to each other DES at this time as well). This is step 904. If, on the other hand, the EAPR determines that queuing is not necessary (i.e., the system is in an "available" mode), the EAPR sends the DES an access request "granted" response. The DES responds at step 906 by turning "on" the attached appliance either according to the APC (if in "busy" mode), immediately if either an APR exists or the access request "granted" is received (if in "available" mode). At step 908, the DES reports actual queuing time and a power draw measure. The EAPR stores that DES data and updates a DES profile in step 910. This completes the interaction.

FIG. 10 illustrates the operation of the EAPR queuing prioritization process of this disclosure that is used to grant access to the power supply that is shared by the access points. According to this embodiment, and while the electric system total power draw is below a set "planned peak-power" threshold, DES access to power supply is granted. This is the "available" mode. When the electric network total power draw is above the set "peak-power" threshold, however, the EAPR starts its access queuing process. This is the "busy" mode. The prioritization process generally works as follows. When electric appliances that are in an "off" state request access to power supply, they are queued. If there is more than "one" DES in the queue, the DES queuing order is based on their access priority codes. Preferably, APCs also carry each DES maximum acceptable queuing time (a time which preferably should not be exceeded to guarantee service integrity). A DES with a given APC (e.g., representing a shorter time constraint) will have a higher priority in the queue over DESs that have higher-valued APCs. If desired, APRs may be implemented; as noted above, APRs are end-user requests that give immediate access to power supply, bypassing the queue.

The process flow begins at step 1000 with a DES making a power supply access request. As noted above, there may be a plurality of DES devices, and each such device may require access to the power supply at any time. A test is performed at step 1002 to determine whether the power supply is operating below its planned peak-power (or some other designated) threshold. If the outcome of the test at step 1002 is positive, the routine continues at step 1004 and the DES access request is granted. This is the available mode. If, however, the outcome of the test at step 1002 is negative, the peak-power threshold (the GoS) has been met or exceeded. The routine then branches to step 1006 and queuing begins in the manner previously described. At step 1008, a test is performed to determine whether an end-user APR is associated with the DES power supply access request. If so, the routine bypasses the queuing operation and grants the request (by returning to step 1004). If there is no APR associated with the request, a test is performed at step 1010 to determine whether the APC for the DES is greater than the maximum available queuing time. If so, the routine once again returns to step 1004 to grant the access request. If, however, the outcome of the test at step 1010 is negative, a test is performed at step 1012 to determine whether the DES access request is the next one on the queue. If not, the routine returns to step 1006 and the queuing process continues. If, however, the outcome of the test step 1012 is positive, then the access request is granted (because the DES's position in the queue has then been reached).

Preferably, if the system state is "busy," all off state DES are queued right away. The EAPR also may set a new peak-power threshold when the system state changes. In a preferred implementation, this dynamic peak-power threshold change is carried out each time the system state changes.

The above-described queuing scheme provides significant advantages. The technique controls coincident peak demand by regulation of the access points (and, in particular, by providing the APCs to the DESs). In this demand modulation scheme, the on state and associated power draw of each of access point is identified, and a load duration curve for each access point is normalized (i.e., combined with load duration curve(s)) from the other access points) into a probability distribution function that is used to drive the queuing process. In effect, the probability distribution function is a normalized load duration curve that thus accounts for a varying set of "operating states" that may occur with respect to the set of access points (the set of DESs, when viewed collectively). Thus, if there are "n" access points (and DESs), there are $2^n$ possible operating states for the access point set, with each operating state being represented by a set of simultaneous "events" corresponding to some subset of the access points (which subset may include all of the access points) being "on" or "off," as the case may be. For example, if there are three (3) access points, there are eight (8) possible operating states, corresponding to each of the DES devices (labeled A, B and C) being on (a binary "1") or off (a binary "0"). An operating state such as {0, 0, 1} refers to DES "A" being off, DES B being off, and DES C being on. Each operating state has an associated probability of occurrence, and the probabilities add up to 100%. A particular operating state may then be set as the "peak-power" threshold (as described above with respect to FIG. 10). The peak-power threshold typically represents a grade of service (typically expressed as a percentage or decimal fraction) associated with a particular operating state at which queuing is desired (e.g., GoS=2%, representing the operating state when DES ABC are on, which corresponds to operating state {1, 1, 1}). There may be more than one such threshold that triggers the queuing operation.

According to the method, as the operating state of the set (of access points) changes (as represented by the on/off events as DES access requests are received at the EAPR), access to the power supply is selectively queued, or de-queued (if previously queued). This is the operation described above with respect to FIG. 10. The one or more probability thresholds (the GoS values) define where the system is set to become available (no queuing) or busy (queuing), in effect filtering the least frequent events (operating states of the access points, viewed collectively) that demand the highest electric power consumption. The terms "least frequent" and "highest" as used herein should not be taken as limiting the queuing solution to any particular implementation. More generally, the described approach treats the electric power demand as analogous to a wave transmission ("on/off" digital wave), and the queuing operation effectively adjusts the phase of this wave signal, providing a form of phase modulation. Thus, for example, the modulation adjusts the phase of first appliance's operational frequency to minimize "collisions" with one or more other appliance signals, therefore reducing the system aggregate power demand. By reducing demand, electrical power customers receive a significant economic benefit (namely, reduced power costs). In this manner, the queuing technique provides a unique channel access method for an electric power system.

In an alternative embodiment, the technique may be used to increase coincident demand (i.e. modulating the amplitude of the aggregate wave signal by making phase adjustments to the individual wave signals).

Figure 11:
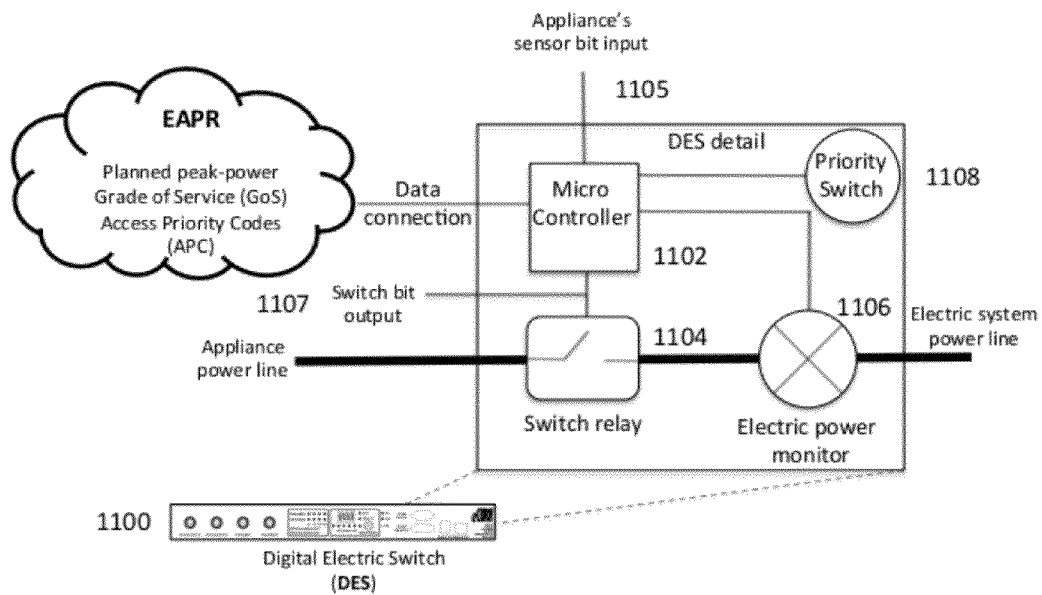
FIG. 11 illustrates a representative digital electronic switch (DES) configuration.

FIG. 11 illustrates a representation DES. As noted above, preferably there is a DES associated with an access point, and one or more electrical appliances or devices may be associated with a particular DES. Once the EAPR determines that the system is or should be "busy," the DES uses the APC to enforce the required queuing at the access point. The DES typically is implemented using hardware components, or hardware and software components. As seen in FIG. 11, a representative (but non-limiting implementation) of the DES 1100 comprises several components: a microcontroller 1102, a switch relay 1104, an electric power monitor 1106, and a priority switch 1108. As described above, the primary role of the DES is to request access to power supply and grant it according to EAPR instructions so coincident peak demand is modulated. In addition, the DES authenticates, reports its power draw to the EAPR, and performs automation routines. Power draw is monitored by the power monitor 1106 to detect DES malfunction and profile the appliance's power usage patterns. Power draw, usage frequency, location and APRs are considered by the EAPR to grant access to the power supply. The DES priority switch 1108 generates end-user access priority requests (APR) in the event a received APC does not reflect immediate end-user service requirements. The microcontroller 1102 controls the various functions including authenticating and establishing secure digital communications with the EAPR through the data connection, issuing the requests (to the EAPR) to access the power supply, and controlling switch relay 1104 to switch electric power "on" at a given time based on its queuing order and APC. The microcontroller also captures end-user access priority requests generated by the priority switch 1108 and executes other EAPR-supplied automation routines. Once it is granted access to the power supply, the DES becomes an active network server within the context of the probability distribution function (e.g., a transformed Erlang C distribution). As such, its power draw is added to the electric system total power draw and verified against the peak power threshold for the queuing algorithm.

One or more sensor-automated appliances (not shown) connect to the DES "sensor's bit" input 1105. Because an appliance sensor is responsible for turning the appliance "on," this bit triggers the EAPR request to access power. When access is granted by the EAPR, the "switch bit" output signal 1107 turns the appliance "on," while the DES power line monitor circuit 1106 measures the appliance power draw.

Figure 12:
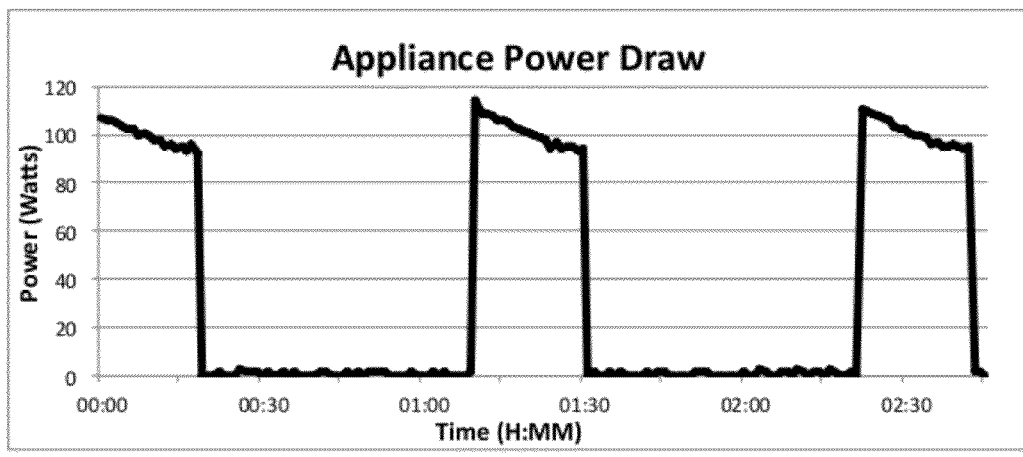
FIG. 12 is a plot that represents a statistical measure of an appliance draw at an access point.

FIG. 12 is a plot that represents a statistical measure of an appliance power draw at a particular DES. As has been described, the APC parameters (power draw, usage time, usage frequency, location, end-user maximum queuing time, and any APR) are used by the EAPR to define APCs that prioritize queuing order of electric appliances with shorter usage time and higher usage frequency relative to other appliances in the EAPR queue. In addition, a normalized power draw provides a weighting factor that favors DES with lower power draw in the group of DES at the same location according to the following relationships (which are exemplary, but non-limiting):

Normalized power draw=Power draw/Max(system's DES power draw)

APC=(Normalized power draw)*(usage time)^2/(usage frequency)

In one embodiment, the APC value is a DES maximum queuing time, in minutes; preferably, this value does not exceed the minimum of an appliance usage time and its end-user maximum acceptable queuing time:

APC≦Minimum(End-user acceptable queuing time, usage time)

By way of example, a system implementing the described solution comprises an EAPR and a set of DES (e.g., SCADA-compliant) devices that control peak demand at locations (which typically are remote) based on the predictive software algorithm executing in the power router. As has been described, the EAPR operates to minimize access point queuing time and power draw collisions from the power supply (by predictably calculating and implementing operational phase shifts), thereby reducing peak-power demand from the cycling appliances, devices and services that the EAPR controls. The DES functionality may be implemented in hardware, firmware or software.

The EAPR (or some functionality thereof) may be implemented within a cloud embodiment as a "software-as-a-service."

The system may be implemented within a single physical facility, across multiple physical facilities, or the like. In an alternative embodiment, the system is implemented in a modular, hierarchical architecture, e.g., wherein software resident on regional servers provides local monitoring and control of DES devices wirelessly connected thereto, while a central server (in which the EAPR executes) oversees the regional servers.

In example embodiments, the DES devices are located within telecommunications shelters, radio equipment rooms, computer server rooms, commercial properties, institutional and educational campuses, upstream and downstream oil and gas drilling sites and refineries, electric vehicle charging stations, municipal power systems, government facilities, electric utilities, and others.

The link between the EAPR and a DES preferably is secure. The APC codes may be transmitted over any IP-based or other transport layer protocol including, without limitation, via SMTP as an email message, via NNTP (telnet), via SMS (text) or MMS (multimedia) messages, via HTTP over SOAP (as a web service), or the like. The APCs sent to the DES preferably are AT (Attention) commands and, as such, can be sent in analog form. The command sent to the DES is a value that may be understood as being "time." Preferably, the value is updated each time that the EAPR handshakes with the DES.

The DES functionality may be incorporated into an existing SCADA-compliant or other type of electrical device or appliance. It is not required that the DES be implemented as a standalone device; rather, the one or more described functions may be added to an existing electrical device/appliance by a software or other configuration. In this approach, a system provider provides the EAPR function (e.g., as a cloud-based service) and connects to devices/appliances that have been configured to provide the access point functionality and operations described. This approach reduces the cost of implementing a turnkey solution, as it takes advantage of existing hardware at the control point(s).

The demand modulation provided by the disclosed subject matter may be implemented in any physical arrangement of the EAPR/DES functionality that has been described.

The use of Erlang probability distribution as described herein is preferred but is not intended to limit the disclosed subject matter. The Erlang probability distribution is a special case of a Gamma distribution, and any such distribution may be used as well. Other probability distributions that may be applied include the Poisson distribution, the Pareto distribution, the Bernoulli process distribution, and the Engset calculation.

The system components as have been described are a representative embodiment. It is not required that all such components be included, or that the identified boundaries be as shown. One of more components may be combined or associated with the system or other entities, as the case may be, without departing from the scope of the described subject matter. It is not required that the components be located within the same data center. The EAPR or DES comprises computing machinery and associated electronics and/or mechanical devices as needed. The functions described may be implemented by machines, devices, programs, controllers, switches, processes, execution threads, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The subject matter herein can take the form of an entirely hardware embodiment, an entirely software embodiment, or an embodiment containing both hardware and software elements. In one embodiment, the functionality is implemented in software executing in one or more server machines. The disclosed system (or portions thereof) may take the form of a computer program product accessible from a computer-usable or computer-readable medium providing program code for use by or in connection with a computer or any instruction execution system. A computer-usable or computer readable medium can be any device or apparatus that can store the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

While given components of the system have been described separately, one of ordinary skill will appreciate that some of the functions may be combined or shared in given instructions, program sequences, code portions, and the like.

Having described our invention, what we now claim is as follows.

The invention claimed is:

1. Apparatus, comprising:
at least one hardware processor; and
computer memory holding computer program instructions executed by the hardware processor to provide a method of queuing access to a power supply shared by a set of electrical power access points, the method comprising:
for each access point, identifying a power draw value associated with the access point being in an on state, the power draw value associated with a load duration curve;
normalizing the load duration curves for a set of operating states of the access points to generate a probability distribution function, the probability distribution function having a set of probability thresholds corresponding to the number of operating states, the probability thresholds including at least one threshold representing a particular grade of service (GoS) at which access to the power supply should be queued; and
queuing access to the power supply when, in response to a first change in operating state, the threshold representing the grade of service is met.

2. The apparatus as described in claim 1 wherein the probability distribution function is a transformed Erlang C probability distribution.

3. The apparatus as described in claim 2 wherein the transformed Erlang C probability distribution function models a load duration curve associating a total power demand for the particular grade of service.

4. The apparatus as described in claim 1 wherein at least first and second access points have independent power draws.

5. The apparatus as described in claim 4 wherein the first and second access points are geographically distributed from one another.

6. The apparatus as described in claim 1 wherein one or more appliances are associated with a particular access point.

7. The apparatus as described in claim 1 wherein the step of queuing access to the power supply adjusts a turn-on of an appliance associated with a particular access point.

8. The apparatus as described in claim 7 wherein the turn-on is adjusted by providing the particular access point with an access priority code, the access priority code being a member of a set of access priority codes (APCs) that are provided to the access points including the particular access point, the set of access priority codes defining a relative queuing order of the access points to minimize access point queuing time and power draw collisions from the power supply.

9. The apparatus as described in claim 1 wherein the method further includes de-queuing access to the power supply when, in response to a second change in operating state, the threshold representing the grade of service ceases to be met.

10. The apparatus as described in claim 1 wherein the probability distribution function is re-generated continuously.

11. The apparatus as described in claim 1 wherein the method is implemented as a service on behalf of one or more participating entities.

12. A power demand management system, comprising:
a set of switches, wherein each switch of the set of switches is associated with an electrical power access point, the electrical power access point being one of a set of electrical power access points that provide shared access to a power supply; and
a power router, the power router comprising a hardware element operating software configured to:
for each access point, identify a power draw value associated with the access point being in an on state, the power draw value associated with a load duration curve;
normalize the load duration curves for a set of operating states of the access points to generate a probability distribution function, the probability distribution function having a set of probability thresholds corresponding to the number of operating states, the probability thresholds including at least one threshold representing a particular grade of service (GoS) at which access to the power supply should be queued; and
queue access to the power supply when, in response to a first change in operating state, the threshold representing the grade of service is met.

13. The power demand management system as described in claim 12 wherein the probability distribution function is a transformed Erlang C probability distribution.

14. The power demand management system as described in claim 13 wherein the transformed Erlang C probability distribution function models a load duration curve associating a total power demand for the particular grade of service.

15. The power demand management system as described in claim 12 wherein at least first and second access points have independent power draws.

16. The power demand management system as described in claim 12 wherein one or more appliances are associated with a switch at a particular access point.

17. The power demand management system as described in claim 12 wherein the power router queues access to the power supply by controlling a switch at a particular access point to adjust turn-on of an appliance associated with the switch.

18. The power demand management system as described in claim 17 wherein the turn-on is adjusted by the power router providing the switch at the particular access point with an access priority code, the access priority code being a member of a set of access priority codes (APCs) that are provided to the set of switches including the switch at the particular access point, the set of access priority codes defining a relative queuing order of the set of switches to minimize individual access point queuing time and power draw collisions from the power supply.

19. The power demand management system as described in claim 18 wherein an access priority code (APC) is a function of an end-use service requirement associated with at least one electric appliance associated with the switch that is located at the access point.

20. The power demand management system as described in claim 12 wherein the power router de-queues access to the power supply when, in response to a second change in operating state, the threshold representing the grade of service ceases to be met.

21. The power demand management apparatus as described in claim 12 wherein a switch is associated with a SCADA-compliant device.

22. The power demand management apparatus as described in claim 12 wherein the power router re-generates the probability distribution function continuously.

23. Apparatus associated with an electrical access point, the electrical access point being one of a set of distributed access points that share a power supply, comprising:
   at least one hardware processor; and
   computer memory holding computer program instructions executed by the hardware processor to provide a method, the method comprising:
      providing data identifying a power draw associated with the access point;
      periodically receiving an access priority code (APC) for the access point, the APC being one of a set of access priority codes periodically returned to the set of access points to define a relative queuing order of the access points to minimize individual access point queuing time and power draw collisions from the power supply, the set of access priority codes being derived from a probability distribution function having a set of one or more probability thresholds representing grade(s) of service (GoS) at which access to the power supply should be queued or de-queued; and
      enabling access to the power supply according to the APC.

24. The apparatus as described in claim 23 wherein one or more electrical devices are associated with the access point.

25. The apparatus as described in claim 24 wherein the one or more electrical devices include a SCADA-compliant device.

26. The apparatus as described in claim 24 wherein the one or more electrical devices include a control device that regulates an electrical operation of a cycling electrical appliance.

27. The apparatus as described in claim 23 wherein the probability distribution function is a transformed Erlang C probability distribution.

28. The apparatus as described in claim 23 wherein the APC sets a relative queuing order for turn-on of an appliance associated with the access point.

\* \* \* \* \*